United States Patent
Guo

(10) Patent No.: US 9,857,528 B2
(45) Date of Patent: Jan. 2, 2018

(54) BACKLIGHT MODULE AND PLASTIC FRAME AND REFLECTION SHEET OF THE SAME

(71) Applicant: Shenzhen China Star Optoelectronics Technology Co., Ltd., Shenzhen, Guangdong (CN)

(72) Inventor: Qing Guo, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 136 days.

(21) Appl. No.: 14/433,654

(22) PCT Filed: Dec. 17, 2014

(86) PCT No.: PCT/CN2014/094086
§ 371 (c)(1),
(2) Date: Apr. 4, 2015

(87) PCT Pub. No.: WO2016/090664
PCT Pub. Date: Jun. 16, 2016

(65) Prior Publication Data
US 2016/0370537 A1    Dec. 22, 2016

(30) Foreign Application Priority Data
Dec. 10, 2014 (CN) .......................... 2014 1 0757884

(51) Int. Cl.
*G02B 6/00* (2006.01)
*F21V 8/00* (2006.01)
(Continued)

(52) U.S. Cl.
CPC ......... *G02B 6/0088* (2013.01); *G02B 6/0055* (2013.01); *G02F 1/1335* (2013.01)

(58) Field of Classification Search
CPC ................ G02B 6/0055; G02B 6/0088; G02F 1/133308; G02F 2001/133317; G02F 1/1335
See application file for complete search history.

(56) References Cited

U.S. PATENT DOCUMENTS

2003/0179566 A1    9/2003   Ito
2008/0316769 A1   12/2008   Terada et al.
(Continued)

FOREIGN PATENT DOCUMENTS

CN         201395031 Y      2/2010

*Primary Examiner* — Anh Mai
*Assistant Examiner* — Nathaniel Lee
(74) *Attorney, Agent, or Firm* — Andrew C. Cheng

(57) ABSTRACT

A backlight module, a plastic frame and a reflection sheet of the backlight module are disclosed. The backlight module includes a plastic frame and a reflection sheet disposed at a bottom side of the plastic frame. Wherein, the reflection sheet includes a first folding structure; a second folding structure is formed at a bottom portion of the plastic frame; the first folding structure and the second folding structure are complementary and are correspondingly adhered and connected for fixing the reflection sheet at the bottom side of the plastic frame. Accordingly, under a condition without increasing a width of the plastic frame, connection reliability between the plastic frame and the reflection sheet is ensured.

7 Claims, 2 Drawing Sheets

(51) Int. Cl.
*G02F 1/1335* (2006.01)
*G02B 6/36* (2006.01)

(56) References Cited

U.S. PATENT DOCUMENTS

| | | | |
|---|---|---|---|
| 2009/0231507 A1* | 9/2009 | Oohira | G02F 1/133608 349/58 |
| 2011/0261282 A1* | 10/2011 | Jean | G02F 1/133308 349/58 |

* cited by examiner

BACKLIGHT MODULE AND PLASTIC FRAME AND REFLECTION SHEET OF THE SAME

BACKGROUND OF THE INVENTION

1. Field of the Invention

The present invention relates to the display technology field, and more particularly to a backlight module, and a plastic frame and a reflection sheet of the backlight module.

2. Description of Related Art

A narrow frame design for a backlight module is the development trend of the current display device. Generally, the backlight module of the display device utilizes no backplane design to achieve the narrow frame design. Accordingly, when assembling the backlight module, because the lack of the support by the backplane for a reflection sheet located at a bottom side of a plastic frame of the backlight module, the reflection plate is required to be attached to the plastic frame by some ways.

Currently, to ensure the adhesive reliability between the plastic frame and the reflection sheet, the plastic frame is required to maintain a certain width. However, the narrow frame design is unable to achieve by the above design.

SUMMARY OF THE INVENTION

The present invention provides a plastic frame and a reflection sheet. Under a condition without increasing the width of the plastic frame, the connection reliability between the plastic frame and the reflection sheet is ensured.

An embodiment of the present invention provides a backlight module comprising: a plastic frame; and a reflection sheet disposed at a bottom side of the plastic frame; wherein, the reflection sheet includes a first folding structure; a second folding structure is formed at a bottom portion of the plastic frame; the first folding structure and the second folding structure are complementary and are correspondingly adhered and connected for fixing the reflection sheet at the bottom side of the plastic frame.

Wherein, a recess is disposed at an edge of the bottom portion of the plastic frame to form the second folding structure having a second step shape; an end of the reflection sheet is folded to form a first step shape which is complementary to the second step shape in order to form the first folding structure.

Wherein, the recess having the second step shape is an L shape, and the first step shape is an L shape.

Wherein, a width of the recess is not less than a thickness of the reflection sheet.

Wherein, the first folding structure and the second folding structure are adhered and connected through a tape.

Wherein, the backlight module is a narrow-frame backlight module.

Wherein, the backlight module further comprises a light source, a light uniformity member, and an optical film.

An embodiment of the present invention provides a plastic frame of a backlight module, wherein, a second folding structure is formed at a bottom portion of the plastic frame, and the second folding structure is used for adhering and connecting a reflection sheet of a backlight module.

An embodiment of the present invention provides a reflection sheet of a backlight module, wherein, the reflection sheet includes a first folding structure and the first folding structure is used for adhering and connecting a plastic frame of a backlight module.

In summary, in the present invention, an adhesive portion of the plastic frame of the backlight module and the reflection sheet of the backlight module is provided with the first folding structure and the second folding structure. An area of the adhesive portion between the plastic frame and the reflection sheet is increased such that the adhesive reliability between the plastic frame and the reflection sheet is improved. As a result, under a condition without increasing a width of the plastic frame, connection reliability between the plastic frame and the reflection sheet is ensured.

DETAILED DESCRIPTION OF THE PREFERRED EMBODIMENT

The following description is for the purpose of illustration not for limitation, and specific details are proposed such as the system configuration, the interface, and the technique in order to completely understand the present application. However, the person of ordinary skill in the art should know, in other embodiments without these specific details can also achieve the present application. In other instances, well-known devices, circuits and methods are omitted to prevent the unnecessary details hindering the description of the present application.

Figure 1:
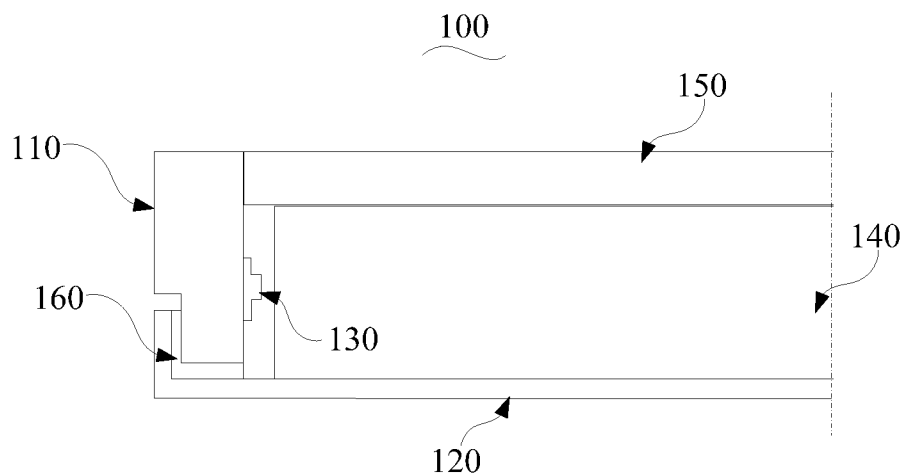
FIG. 1 is a partial cross-sectional view of a backlight module according to an embodiment of the present invention.
Figure 2:
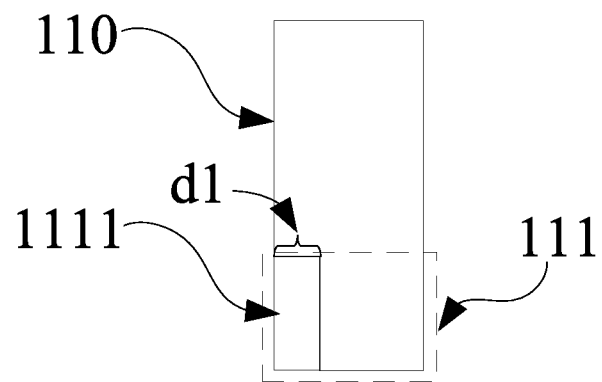
FIG. 2 is a cross-sectional view of a plastic frame shown in FIG. 1.
Figure 3:
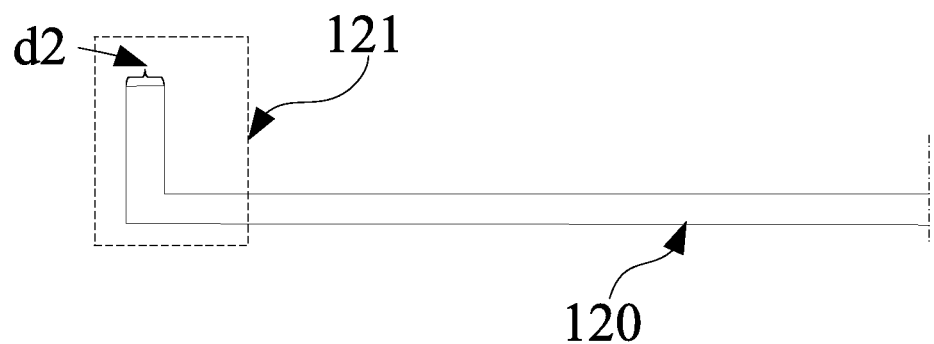
FIG. 3 is a cross-sectional view of a reflection sheet shown in FIG. 1.

With reference to FIG. 1 to FIG. 3, wherein, FIG. 1 is a partial cross-sectional view of a backlight module according to an embodiment of the present invention; FIG. 2 is a cross-sectional view of a plastic frame shown in FIG. 1; FIG. 3 is a cross-sectional view of a reflection sheet shown in FIG. 1. In the present embodiment, a backlight module 100 comprises a plastic frame 110 and a reflection sheet 120. The reflection sheet 120 is disposed at a bottom side of the plastic frame 110.

The reflection sheet 120 includes a first folding structure 121 (shown in FIG. 3). The plastic frame 110 include a second folding structure 111 (shown in FIG. 2) formed at a bottom portion of the plastic frame 110. The first folding structure 121 and the second folding structure 111 are complementary and are correspondingly adhered and connected to realize fixing the reflection sheet 120 at a bottom portion of the plastic frame 110. For example, between the first folding structure 121 of the reflection sheet 120 and the second folding structure 111 of the plastic frame 110, an adhesive member 160 such as a tape is provided such that fixing the first folding structure 121 and the second folding structure 111 is achieved.

In the present embodiment, an adhesive portion of the plastic frame of the backlight module and the reflection sheet of the backlight module is provided with the first folding structure 121 and the second folding structure 111. An area of the adhesive portion between the plastic frame and the reflection sheet is increased such that the adhesive reliability between the plastic frame and the reflection sheet is improved. As a result, under a condition without increasing a width of the plastic frame, connection reliability between the plastic frame and the reflection sheet is ensured.

With reference to FIG. 1 and FIG. 2, in one embodiment, at an edge portion of the bottom portion of the plastic frame 110 (preferably, at an outer edge, that is, close to an outer side of the plastic frame), a recess 1111 is disposed to form the second folding structure 111 having a second step shape. An end of the reflection sheet 120 is folded to form the first folding structure 121 having a first step shape which is complementary to the second step shape.

Preferably, as shown in FIG. 1, each of the first folding structure and the second folding structure is a step shape with one stage. That is, the shape of the recess is an L shape. By the L-shape structure, the adhesive portion of the plastic frame and the reflection sheet is increased from one side to two sides. Besides, an area of the adhesive portion of the plastic frame 110 and the reflection sheet 120 can be adjusted according to an actual requirement. Under a condition that the width of the plastic frame is unchanged, the area of the adhesive portion of the plastic frame 110 and the reflection sheet 120 can be adjusted through controlling a length of a vertical portion of the L shape. Besides, the L-shape structure can not only increase the area of the adhesive portion, but also be simple in the structure. For the plastic frame 110, only the recess 1111 having a strip shape is required. For the reflection sheet 120, a length of the end of the reflection sheet 120 corresponding to the recess 1111 of the plastic frame 110 is folded. A width d1 of the recess 1111 is not less than a thickness d2 of the reflection sheet 120 such that the width of the plastic frame 110 will not increase after the plastic frame 110 and the reflection sheet 120 are adhered.

Figure 4:
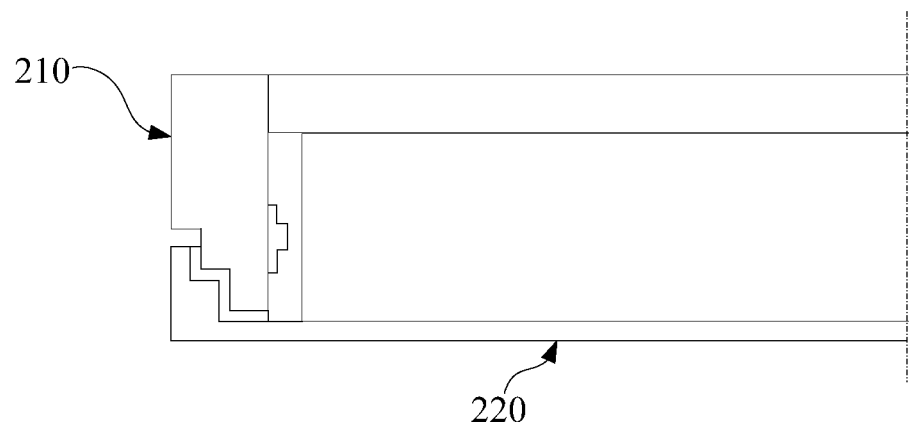
FIG. 4 is a partial cross-sectional view of a backlight module according to another embodiment of the present invention.

In another embodiment, the first step shape and the second step shape described above are not limited to the step shape having one stage as shown in FIG. 1. Each of the first step shape and the second step shape may also be a step shape having multiple stages. As shown in FIG. 4, each of a second folding structure of a plastic frame 210 and a first folding structure of a reflection sheet 220 is a step shape having two stages. Besides, the first folding structure and the second folding structure are not limited to the step shape. Another shape such as a V shape may also be provided.

Furthermore, the above embodiments only schematically describe the adhesive connection between the plastic frame and the reflection sheet at one side. However, in a practical application, in the backlight module, all sides of the adhesive connections between the plastic frame and the reflection sheet are adhered and connected utilizing the above design.

With reference to FIG. 1, in a specific embodiment, the backlight module 100 further comprises a light source 130, a light uniformity member 140, and an optical film 150. Wherein, FIG. 1 is a side-light type backlight module, and the light uniformity member 140 is a light conductive plate. The light uniformity member 140 is disposed above the reflection sheet 120. The light source 130 is disposed between the plastic frame 110 and the light uniformity member 140. The optical film 150 is disposed above the light uniformity member 140. When the backlight module 100 is a direct-light type, the light uniformity member 140 is a diffusion plate.

Optionally, the backlight module 100 is a narrow-frame backlight module. The width of the plastic frame 110 is narrowed down. For example, the width of the plastic frame 110 is less than 1 cm, and preferably less than 0.5 cm. Because the adhesive portion of the plastic frame 110 and the reflection sheet 120 are folded, the area of the adhesive portion is increased. That is equal to that the width of the plastic frame 110 is narrowed down. The connection reliability between the plastic frame 110 and the reflection sheet 120 can also be achieved.

The present invention also provides a plastic frame of a backlight module. A bottom portion of the plastic frame forms a second folding structure. The second folding structure is used for adhering and connecting with a reflection sheet of a backlight module.

Optionally, a recess is disposed at edge of the bottom portion of the plastic frame in order to form a second folding structure having a second step shape.

Optionally, the plastic frame is one of the plastic frames described above.

Optionally, in order to provide a buffer protection for the members in the backlight module. For the plastic frames described above, each of the plastic frames includes a main plastic frame, a projection structure disposed at an inner side of the main plastic frame and a buffer strip disposed at the projection structure. The projection structure is made of an elastic material.

The present application also provides a reflection sheet of a backlight module. The reflection sheet includes a first folding structure, and the first folding structure is used for adhering and connecting a plastic frame of a backlight module.

Optionally, an end of the reflection sheet is folded to form a first step shape in order to form the first folding structure.

Optionally, the reflection sheet is one of the reflection sheets described in the above embodiments.

Optionally, to decrease the affection of the heat generated by the light source to reflection sheet. Each of the reflection sheets described above includes a first reflection unit and a second reflection unit. Wherein, comparing to the second reflection unit, the first reflection unit is far away from the light source of the backlight module. An anti-high-temperature property of the first reflection unit is better than the second reflection unit.

In summary, in the present invention, an adhesive portion of the plastic frame of the backlight module and the reflection sheet of the backlight module is provided with the first folding structure and the second folding structure. An area of the adhesive portion between the plastic frame and the reflection sheet is increased such that the adhesive reliability between the plastic frame and the reflection sheet is improved. As a result, under a condition without increasing a width of the plastic frame, connection reliability between the plastic frame and the reflection sheet is ensured.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A backlight module, comprising:
a plastic frame having a bottom portion and a top portion; and
a reflection sheet disposed at and adhered to the bottom portion of the plastic frame;
wherein, the reflection sheet includes a first folding structure; a second folding structure is formed at the bottom portion of the plastic frame, and having a bottom side and an outer edge side; the first folding structure and the second folding structure are complementary and are correspondingly adhered and connected at each of the bottom side and the outer edge side through an adhesive member for fixing the reflection sheet at the bottom portion of the plastic frame;
wherein, a recess is disposed at an edge of the bottom portion of the plastic frame; and
wherein, a width of the plastic frame at the top portion is greater than a width of the plastic frame at the bottom portion.

2. The backlight module according to claim 1, wherein, the recess disposed at the edge of the bottom portion of the plastic frame forms the second folding structure having a second step shape; an end of the reflection sheet is folded to form a first step shape which is complementary to the second step shape in order to form the first folding structure; wherein, the first folding structure has a top side and an inner edge side, the top side and the inner edge side of the first folding structure are respectively adhered and connected to the bottom side and the outer edge side of the second folding structure through the adhesive member.

3. The backlight module according to claim 2, wherein, the recess having the second step shape is an L shape and the first step shape is an L shape.

4. The backlight module according to claim 3, wherein, a width of the recess is greater than a thickness of the reflection sheet.

5. The backlight module according to claim 4, wherein, the backlight module further comprises a light source, a light uniformity member, and an optical film, wherein, the light source is disposed between the plastic frame and the light uniformity member, and the light source is also disposed between the inner edge side of the first folding structure and the light uniformity member, and disposed at a side of the plastic frame opposite to the outer edge side;
wherein, the plastic frame further has a middle portion, and a width of the plastic frame at the middle portion is the same as the width of the plastic frame at the top portion; and
wherein, the light uniformity member is directly above and contacted with the reflection sheet, and the light uniformity member is supported by the reflection sheet.

6. The backlight module according to claim 1, wherein, the first folding structure and the second folding structure are adhered and connected through a tape.

7. The backlight module according to claim 1, wherein, the backlight module is a narrow-frame backlight module, and each of the first step shape and the second step shape has multiple stages.

* * * * *